US012780353B2

(12) United States Patent
Osawa et al.

(10) Patent No.: US 12,780,353 B2
(45) Date of Patent: Nov. 3, 2026

(54) DRIVE MOTOR LAYOUT FOR ELECTRIC VEHICLE

(71) Applicant: YAMAHA HATSUDOKI KABUSHIKI KAISHA, Iwata (JP)

(72) Inventors: Kensuke Osawa, Shizuoka (JP); Kazunari Takata, Shizuoka (JP); Atsushi Yasuda, Shizuoka (JP); Masahiro Yoshida, Shizuoka (JP); Kenta Higashiyama, Shizuoka (JP); Kensuke Kamada, Shizuoka (JP); Seiji Umekita, Shizuoka (JP); Yasuo Miyake, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 365 days.

(21) Appl. No.: 18/081,749

(22) Filed: Dec. 15, 2022

(65) Prior Publication Data

US 2023/0192232 A1 Jun. 22, 2023

(30) Foreign Application Priority Data

Dec. 21, 2021 (JP) ................................ 2021-207433

(51) Int. Cl.
*B62J 43/20* (2020.01)
*B62J 43/16* (2020.01)
(Continued)

(52) U.S. Cl.
CPC ................ *B62M 7/02* (2013.01); *B62J 43/16* (2020.02); *B62J 43/20* (2020.02); *B62K 5/01* (2013.01); *B62M 9/06* (2013.01)

(58) Field of Classification Search
CPC .... B62M 7/02; B62M 9/06; B62M 2009/007; B62J 43/16; B62J 43/20; B62K 5/01;
(Continued)

(56) References Cited

U.S. PATENT DOCUMENTS 3,533,484 A * 10/1970 Wood, Jr. ................ B62M 6/65 180/206.6
3,554,311 A * 1/1971 Thompson .............. B62J 43/20 180/220
(Continued)

FOREIGN PATENT DOCUMENTS

CN 214776329 U * 11/2021
DE 102017001557 A1 * 8/2018 .............. B62D 1/02
(Continued)

OTHER PUBLICATIONS

Extended European Search Report in EP22213425.6, mailed May 16, 2023, 8 pages.
(Continued)

*Primary Examiner* — Steve Clemmons
(74) *Attorney, Agent, or Firm* — Keating & Bennett, LLP

(57) ABSTRACT

A vehicle includes upper frames, lower frames, a front frame, a rear frame, a pair of rear wheels, a drive motor to drive the pair of rear wheels, a battery to supply electric power to the drive motor, an endless power transmission to connect the drive motor with the pair of rear wheels, a pivot shaft attached to the rear frame, a swing arm supported pivotably by the pivot shaft and supporting the pair of rear wheels, a straddled seat at a higher position than the drive motor, and a bar handle provided at a higher position than the straddled seat. The drive motor is located farther forward than the swing arm.

11 Claims, 14 Drawing Sheets

(51) Int. Cl.
*B62K 5/01* (2013.01)
*B62M 7/02* (2006.01)
*B62M 9/06* (2006.01)

(58) Field of Classification Search
CPC B60Y 2200/124; B60Y 2200/91; B60K 1/00; B60K 17/04; B60K 2001/001; B60K 2001/0405; B60K 2001/0411; B60G 7/02; B60G 9/003; B60G 2200/31
See application file for complete search history.

(56) References Cited

U.S. PATENT DOCUMENTS

| | | | | | |
|---|---|---|---|---|---|
| 5,501,292 | A * | 3/1996 | Kawashima | B62J 43/20 180/220 | |
| 6,702,058 | B2 * | 3/2004 | Ishii | B62K 15/00 180/908 | |
| 6,799,781 | B2 * | 10/2004 | Rasidescu | B62K 5/01 280/786 | |
| 7,306,069 | B2 * | 12/2007 | Takeshima | B62K 19/00 180/312 | |
| 7,588,117 | B2 * | 9/2009 | Fukuda | B62D 21/155 180/291 | |
| 7,618,063 | B2 * | 11/2009 | Takeshima | B62K 5/01 180/311 | |
| 7,637,338 | B2 * | 12/2009 | Maltais | B62J 25/04 180/215 | |
| 8,413,758 | B2 * | 4/2013 | Shiina | B62K 5/01 180/311 | |
| 9,238,495 | B2 * | 1/2016 | Matsuda | B60L 3/0046 | |
| 9,278,725 | B2 * | 3/2016 | Matsuda | B60L 15/20 | |
| 11,400,991 | B2 * | 8/2022 | Takata | B62J 50/22 | |
| 11,413,954 | B2 * | 8/2022 | Matsushima | B62K 11/04 | |
| 11,491,857 | B2 * | 11/2022 | Hendricks | B60K 1/00 | |
| 12,162,339 | B2 * | 12/2024 | Bartz | B60K 1/04 | |
| 2004/0084239 | A1 | 5/2004 | Hioki | | |
| 2007/0261906 | A1 * | 11/2007 | Yao | B62K 5/01 180/292 | |
| 2013/0153321 | A1 * | 6/2013 | Preining | B62M 6/55 180/206.7 | |
| 2015/0251716 | A1 | 9/2015 | Matsuda | | |
| 2019/0144040 | A1 * | 5/2019 | Xiong | B62D 21/183 180/312 | |
| 2020/0031425 | A1 | 1/2020 | Aunkst et al. | | |
| 2023/0226928 | A1 * | 7/2023 | Barnett | B60K 1/04 180/291 | |
| 2024/0343108 | A1 * | 10/2024 | Decuzzi | B60L 50/66 | |

FOREIGN PATENT DOCUMENTS

| | | | | |
|---|---|---|---|---|
| EP | 2799320 A1 | | 11/2014 | |
| EP | 3088285 A2 | * | 11/2016 | B60L 50/51 |
| JP | 2003191881 A | * | 7/2003 | |
| JP | 4214759 B2 | | 1/2009 | |
| JP | 5509811 B2 | | 6/2014 | |
| JP | 2018090209 A | * | 6/2018 | B60K 1/00 |

OTHER PUBLICATIONS

Takata et al., "Vehicle,", U.S. Appl. No. 18/081,746, filed Dec 15, 2022.
Osawa et al., "Vehicle,", U.S. Appl. No. 18/081,748, filed Dec 15, 2022.

* cited by examiner

A-A section

B-B section

DRIVE MOTOR LAYOUT FOR ELECTRIC VEHICLE

CROSS REFERENCE TO RELATED APPLICATIONS

This application claims the benefit of priority to Japanese Patent Application No. 2021-207433 filed on Dec. 21, 2021. The entire contents of this application are hereby incorporated herein by reference.

BACKGROUND OF THE INVENTION

1. Field of the Invention

The present invention relates to vehicles, and more specifically to electric ATVs (All Terrain Vehicles) and the like.

2. Description of the Related Art

Japanese Patent No. 5509811 discloses an electric rough terrain vehicle which is pertinent to conventional techniques of this kind. The vehicle includes a steering shaft which is supported pivotably at a front portion of a vehicle frame; a left-right pair of front wheels steered by means of the steering shaft; a left-right pair of swing arms supported pivotably by the vehicle frame; a left-right pair of rear wheels supported on their shafts by the swing arms; a left-right pair of electric motors disposed between the left and right front wheels for driving the left and right front wheels respectively; a left-right pair of electric motors disposed between the left and right rear wheels for driving the left and right rear wheels respectively; and a battery disposed between the front and the rear wheels.

Also, Japanese Patent No. 4214759 discloses a four-wheeled electric rough terrain vehicle. The vehicle includes an electric motor disposed at a position near a rear portion of a body frame; a pair of rear wheels to which an output from the electric motor is transmitted via a gear case; a plurality of batteries provided in line in a fore-aft direction at a generally intermediate portion of the body frame; and a controller disposed ahead of the batteries.

According to Japanese Patent No. 5509811, the electric motors which drive the rear wheels are disposed between the pair of swing arms, that is, layout of the electric motors are limited by the pair of swing arms. Japanese Patent No. 5509811 discloses nothing about configurations for transmitting the output from the electric motor to the rear wheels via an endless power transmission member.

According to Japanese Patent No. 4214759, the electric motor which drives the rear wheel is disposed on a side of a gear case which also functions as a swing arm, that is, layout of the electric motor is limited by the gear case. Also, Japanese Patent No. 4214759 discloses nothing about configurations for transmitting the output from the electric motor to the rear wheels via an endless power transmission member.

SUMMARY OF THE INVENTION

Preferred embodiments of the present invention provide vehicles that are each able to provide greater freedom in the layout of drive motors that use endless power transmissions.

According to a preferred embodiment of the present invention, a vehicle includes a pair of upper frames spaced apart in a left-right direction, a pair of lower frames spaced apart in a left-right direction, a front frame connecting front portions of the pair of upper frames with the pair of lower frames, a rear frame connecting rear portions of the pair of upper frames with rear portions of the pair of lower frames, a pair of rear wheels, a drive motor to drive the pair of rear wheels, a battery to supply electric power to the drive motor, an endless power transmission to connect the drive motor with the pair of rear wheels, a pivot shaft attached to the rear frame and extending in a widthwise direction of the vehicle, and a swing arm supported pivotably by the pivot shaft and supporting the pair of rear wheels. In the vehicle, the drive motor is located farther forward than the swing arm.

In a preferred embodiment of the present invention, the drive motor and the pair of rear wheels are connected with each other via the endless power transmission, and the drive motor is located farther forward than the swing arm. Therefore, in a configuration utilizing an endless power transmission, layout of the drive motor is not limited by the swing arm, i.e., it is possible to increase the freedom in the layout of the drive motor.

Preferably, the power transmission is located inward of the rear frame in a width direction of the vehicle. In this case, it is possible to make effective use of a space that is outward of the rear frame.

Further preferably, a widthwise length of the drive is less than an end-to-end length of the pivot shaft. In this case, it is possible to reduce the dimension of the drive motor in the widthwise direction of the vehicle, thus making it possible to utilize the space on the side of the drive motor effectively.

Further, preferably, the vehicle further includes a motor fixing bracket between an output side of the drive motor and the lower frame to fix the drive motor to the lower frame. In this case, it is possible to easily fix the drive motor to the lower frame via the motor fixing bracket.

Preferably, the vehicle further includes a power transmission cover attached to the motor fixing bracket to cover the power transmission. In this case, by attaching the power transmission cover directly to the motor fixing bracket, it is possible to decrease the number of parts.

Further preferably, both sides of the drive motor is fixed to the pair of lower frames. In this case, the arrangement increases mounting rigidity of the drive motor, thus making it possible to reduce wobble of the drive motor and further stabilize operation of the drive motor.

Further, preferably, the drive motor is located in a region surrounded by the upper frames, the lower frames, the front frame, and the rear frame in a side view. In this case, the drive motor is attachable/detachable from a side of the vehicle, i.e., the arrangement makes assembly and maintenance operations easy.

Preferably, the drive motor is located forward of the rear frame in a side view. In this case, it is possible to dispose heavy components at/around the vehicle's center of gravity, thus concentrating a mass of the vehicle. Also, it is possible to select a size of the drive motor without limitation posed by the swing arm.

Further preferably, the vehicle further includes a transmission provided between the drive motor and the power transmission to change a speed of an output from the drive motor. In this case, it is possible to efficiently utilize the drive motor, and improve electricity consumption and travel distance. Also, an output shaft of the transmission is able to simply be connected directly with the power transmission. Therefore, the arrangement makes it possible to improve the freedom of layout of the drive motor.

Further preferably, the vehicle further includes a straddled seat provided at a higher position than the drive motor, and a bar handle provided at a higher position than the straddled seat. The structure described above is suitably applied to an ATV.

It is noted that, in preferred embodiments of the present invention, the "transmission" is not limited to those components commonly referred to as a transmission but includes speed reducers and continuously variable transmissions (CVTs).

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 12A and 12B are diagrammatic representations which show a vehicle according to another preferred embodiment of the present invention, wherein FIG. 12A is a front view and FIG. 12B is a plan view.

FIGS. 13A and 13B are diagrammatic representations which show a vehicle according to still another preferred embodiment of the present invention, wherein FIG. 13A is a front view and FIG. 13B is a plan view.

FIGS. 14A and 14B are diagrammatic representations which show a vehicle according to still another preferred embodiment of the present invention, wherein FIG. 14A is a front view and FIG. 14B is a plan view.

DETAILED DESCRIPTION OF THE PREFERRED EMBODIMENTS

Figure 1:
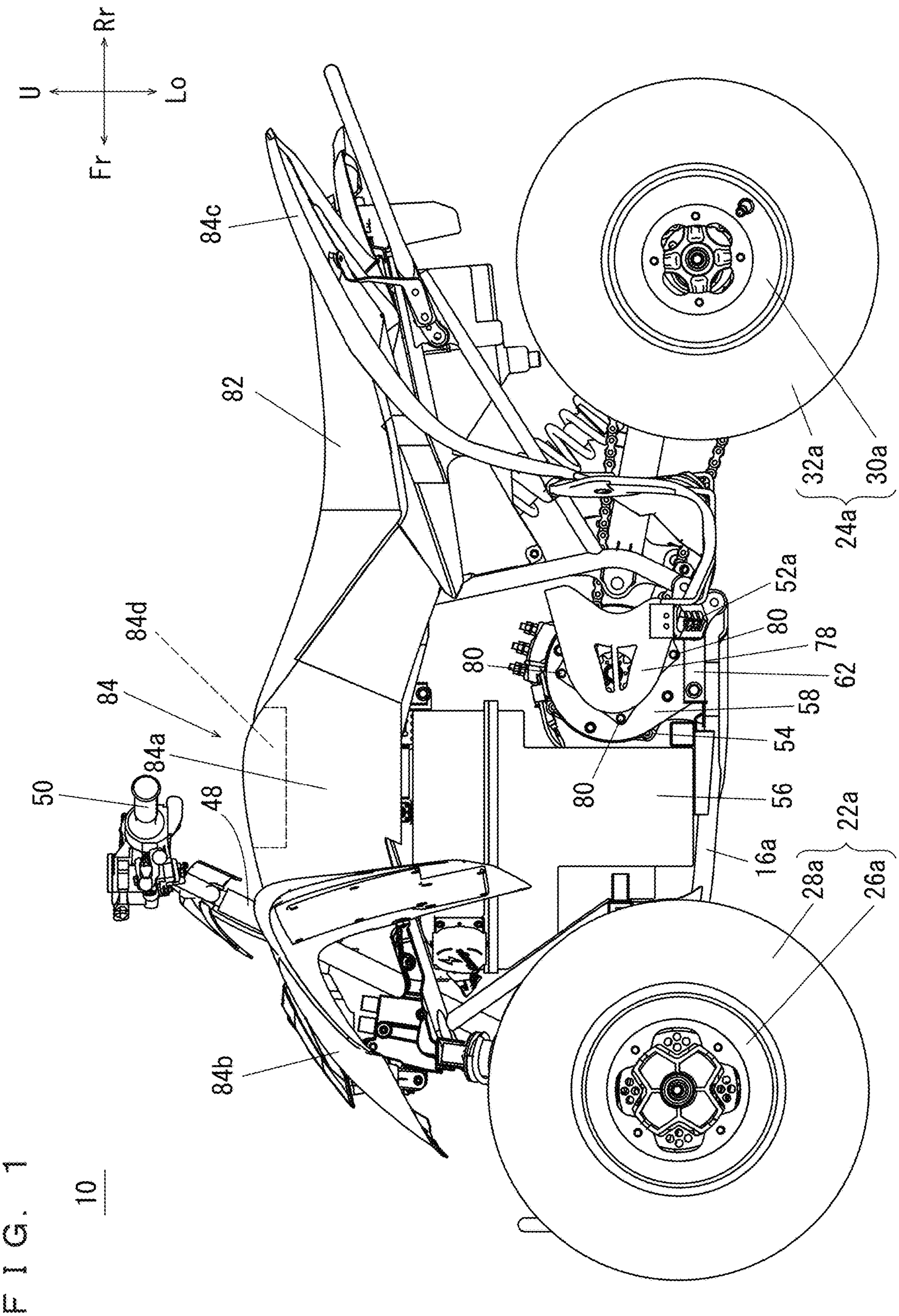
FIG. 1 is a side view which shows a vehicle according to a preferred embodiment of the present invention.

Hereinafter, preferred embodiments of the present invention will be described with reference to the drawings. It should be noted here that the terms front and rear, left and right, and up and down used in the preferred embodiments of the present invention refer to front and rear, left and right, and up and down based on the state where a driver of the vehicle 10 is seated in a straddled seat 82 (which will be described below), facing a bar handle 50 (which will be described below). In the drawings, "Fr" indicates forward, "Rr" indicates rearward, "R" indicates rightward, "L" indicates leftward, "U" indicates upward, and "Lo" indicates downward.

Figure 2:
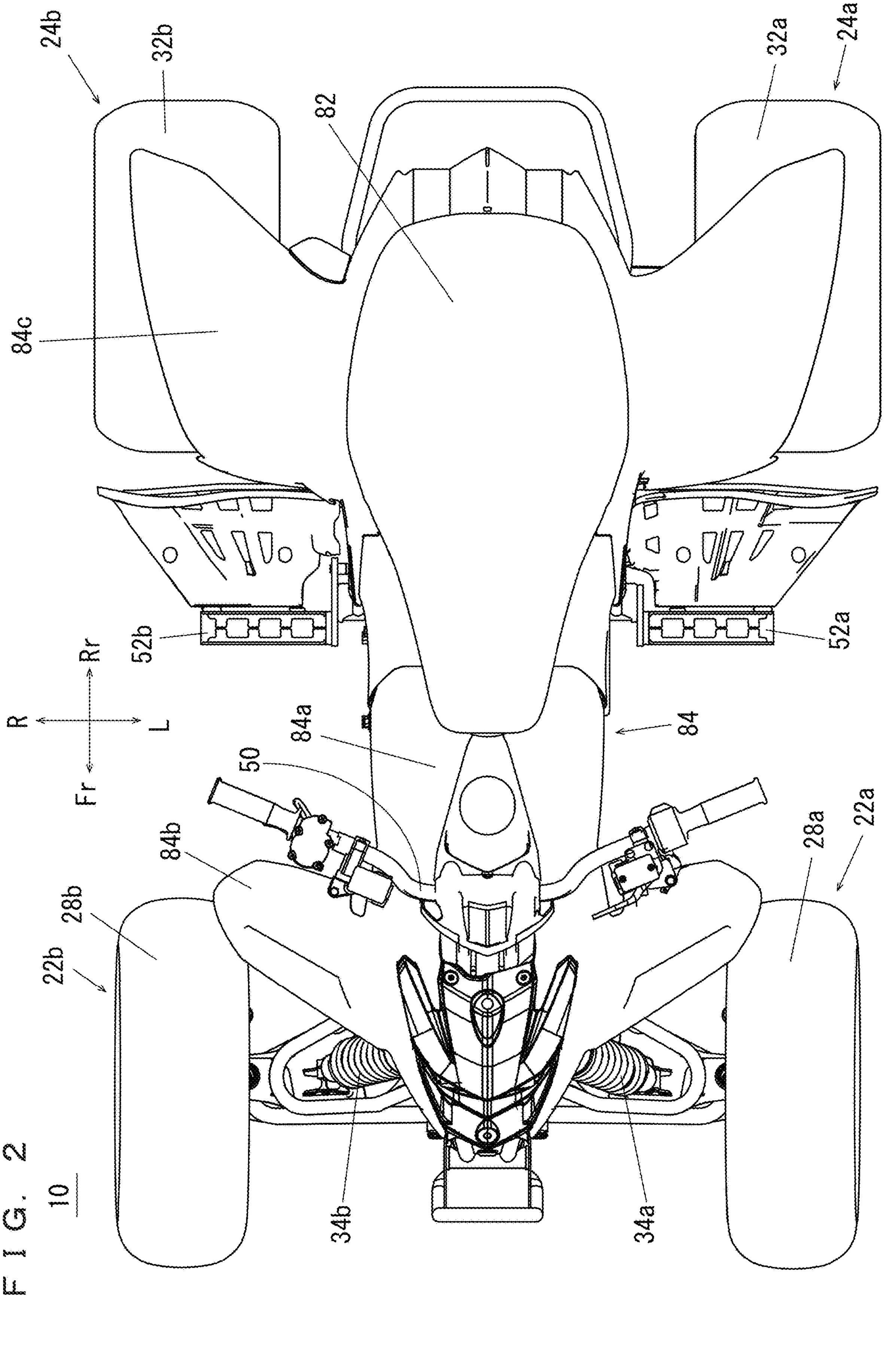
FIG. 2 is a plan view which shows the vehicle in FIG. 1.
Figure 3:
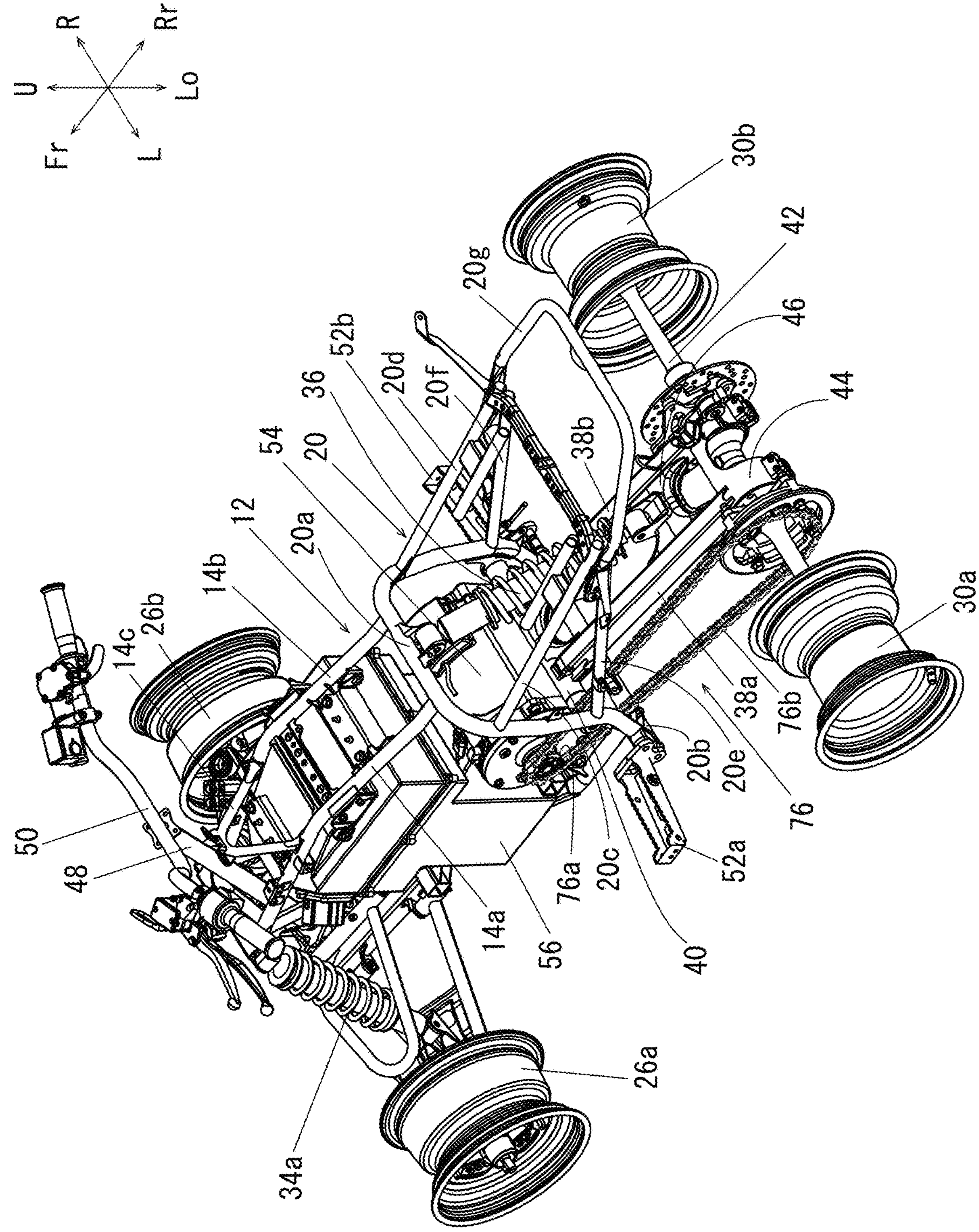
FIG. 3 is a perspective view which shows the vehicle with exterior components removed.
Figure 4:
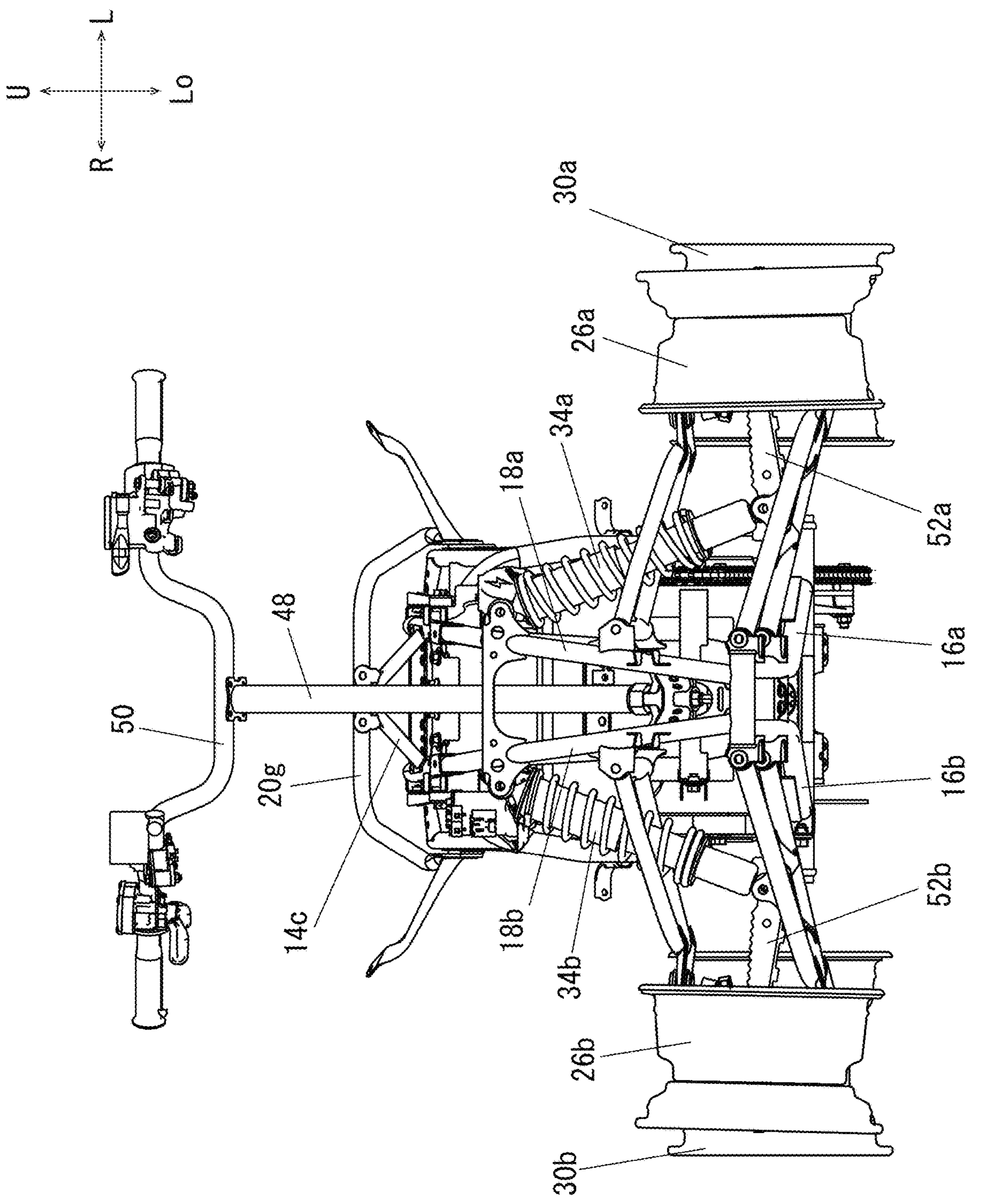
FIG. 4 is a front view which shows the vehicle in FIG. 3.

Referring to FIG. 1 and FIG. 2, a vehicle 10 according to a preferred embodiment of the present invention is an electric ATV which carries one person.

Referring to FIG. 3 through FIG. 9, the vehicle 10 includes a body frame 12. The body frame 12 includes a pair of upper frames 14*a*, 14*b*, a pair of lower frames 16*a*, 16*b*, a front frame 18, and a rear frame 20.

The pair of upper frames 14*a*, 14*b* extend in a fore-aft direction at a distance from each other in a left-right direction, with their intermediate portions having an inverted V-shape in a side view so as to slightly protrude upward. The pair of upper frames 14*a*, 14*b* have their generally intermediate portions connected by a support frame 14*c* which supports a steering shaft 48 (which will be described below). The support frame 14*c* is generally V-shaped, and is provided on the pair of upper frames 14*a*, 14*b* to extend forward and diagonally upward in a side view.

The pair of lower frames 16*a*, 16*b* extend in a fore-aft direction below the pair of upper frames 14*a*, 14*b*, at a distance from each other in a left-right direction such that the distance between the pair is greater between rearward portions than between forward portions.

The front frame 18 connects front portions of the pair of upper frames 14*a*, 14*b* to the pair of lower frames 16*a*, 16*b*. More specifically, the front frame 18 includes a pair of first frames 18*a*, 18*b* which connect the front portions of the pair of upper frames 14*a*, 14*b* with front portions of the pair of lower frames 16*a*, 16*b*; and a pair of second frames 18*c*, 18*d* which connect the front portions of the pair of upper frames 14*a*, 14*b* with generally intermediate portions of the pair of lower frames 16*a*, 16*b*. The pair of second frames 18*c*, 18*d* function as reinforcing members.

The rear frame 20 connects rear portions of the pair of upper frames 14*a*, 14*b* to rear portions of the pair of lower frames 16*a*, 16*b*. More specifically, the rear frame 20 includes a third frame 20*a* which is generally U-shaped in a rear view and generally V-shaped in a side view and connects the rear portions of the pair of upper frames 14*a*, 14*b* to the rear portions of the pair of lower frames 16*a*, 16*b*; a cross member 20*b* which connects two end portions of the third frame 20*a*; a pair of fourth frames 20*c*, 20*d* which extend rearward and slightly upward from upper portions of both sides of the third frame 20*a*; a pair of fifth frames 20*e*, 20*f* which extend rearward and upward from generally intermediate portions in both sides of the third frame 20*a*; and a sixth frame 20*g* which is generally U-shaped. The sixth frame 20*g* is located so that its first end portion is sandwiched by a rear end portion of the fourth frame 20*c* and a rear end portion of the fifth frame 20*e* while its second end portion is sandwiched by a rear end portion of the fourth frame 20*d* and a rear end portion of the fifth frame 20*f*.

A pair of front wheels 22*a*, 22*b* are provided near a front portion of the body frame 12 and a pair of rear wheels 24*a*, 24*b* are provided near a rear portion of the body frame 12 (see FIG. 1 and FIG. 2). The front wheels 22*a*, 22*b* include wheels 26*a*, 26*b* and tires 28*a*, 28*b* assembled to the wheels 26*a*, 26*b* respectively. Likewise, the rear wheels 24*a*, 24*b* include wheels 30*a*, 30*b* and tires 32*a*, 32*b* assembled to the wheels 30*a*, 30*b* respectively.

The pair of front wheels 22*a*, 22*b* are connected to the body frame 12 via suspensions 34*a*, 34*b* respectively.

The pair of rear wheels 24*a*, 24*b* are connected to the body frame 12 via a suspension 36, swing arms 38*a*, 38*b* and so on. In other words, two side portions of the third frame 20*a* of the rear frame 20 are connected with each other via a pivot shaft 40 which extends widthwise of the vehicle. The rear wheels 24*a*, 24*b* are connected with each other by an axle 42 which extends widthwise of the vehicle. At an intermediate portion of the axle 42, an arm support portion 44 is attached rotatably with respect to the axle 42. The pivot shaft 40 and the arm support portion 44 are connected with each other by the swing arms 38*a*, 38*b* extending in a fore-aft direction at a space in a left-right direction from each other. The swing arms 38*a*, 38*b* are supported pivotably by the pivot shaft 40 and support the pair of rear wheels 24*a*, 24*b* via the arm support portion 44. The swing arms 38*a*, 38*b* have their rear portions connected with each other by a connecting portion 46. The suspension 36 is provided at an intermediate portion in the vehicle's widthwise direction, and connects the third frame 20*a* with the connecting portion 46.

A steering shaft 48 is provided to extend through a space between the pair of upper frames 14*a*, 14*b*. The steering shaft 48 has its lower end portion connected with the pair of first frames 18*a*, 18*b* of the front frame 18. The steering shaft 48 is supported, at a position slightly higher than its intermediate portion, by the support frame 14*c*. A bar handle 50 to steer the pair of front wheels 22*a*, 22*b* is attached to an upper end portion of the steering shaft 48. The bar handle 50 is provided at a higher position than the straddled seat 82. When the bar handle 50 is operated, the steering shaft 48 is rotated to steer the front wheels 22*a*, 22*b* via an unillustrated pair of tie rods.

A pair of steps 52*a*, 52*b* are attached to two end portions of the third frame 20*a* of the rear frame 20 to extend outward of the vehicle.

The body frame 12 supports a drive motor 54 which drives the pair of rear wheels 24*a*, 24*b*, and a battery 56 which supplies electric power to the drive motor 54. The drive motor 54 and the battery 56 are provided on the pair of lower frames 16*a*, 16*b*. The drive motor 54 is behind the battery 56, at a location farther forward than the swing arms 38*a*, 38*b*. In a side view, the drive motor 54 is forward of the rear frame 20. Preferably, the battery 56 is an interchangeable rechargeable battery.

The drive motor 54 includes an output shaft 54*a*. In order to fix the drive motor 54 to the lower frame 16*a*, a motor fixing bracket 58 is provided between an output side of the drive motor 54 and the lower frame 16*a*.

Figure 10:
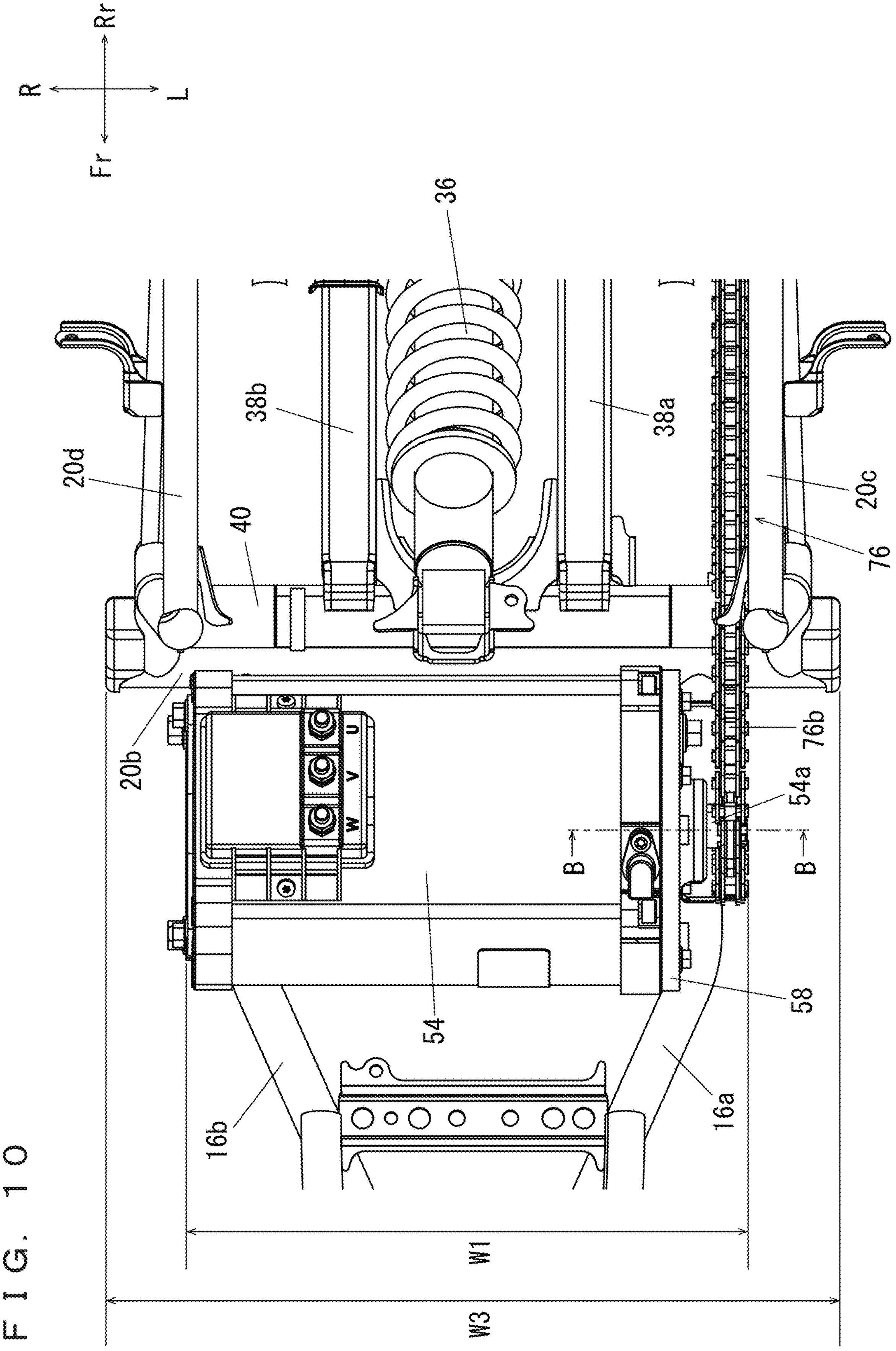
FIG. 10 is an enlarged plan view which shows a top portion and surroundings thereof of a drive motor.
Figure 11:
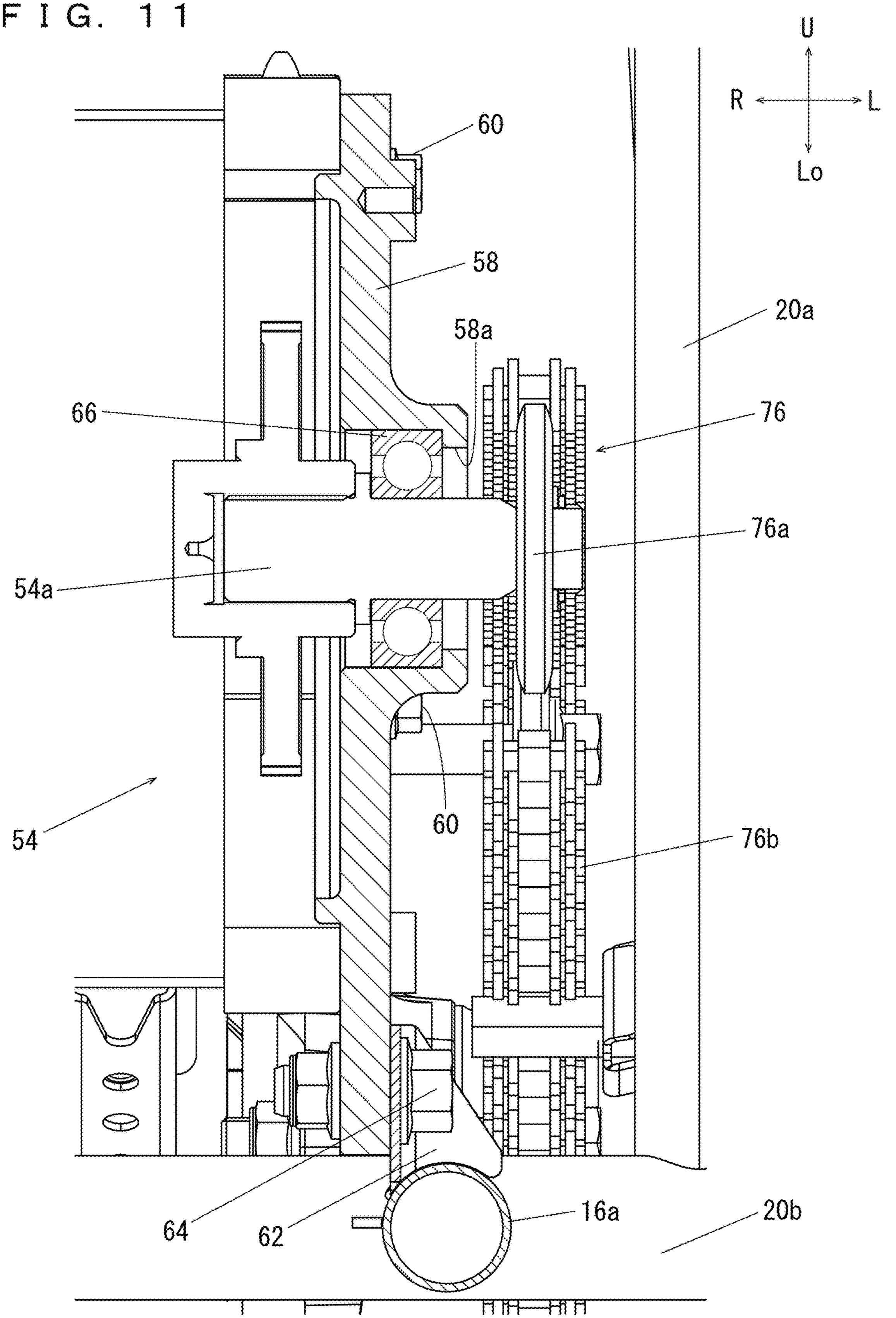
FIG. 11 is a sectional view taken along line B-B in FIG. 10.

Referring also to FIG. 10 and FIG. 11, the motor fixing bracket 58 is attached to an output-side end portion (left end portion in the present preferred embodiment) of the drive motor 54 with a plurality (four in the present preferred embodiment) of fasteners 60. The motor fixing bracket 58 has its lower end portion connected with a flange portion 62 provided in the lower frame 16*a* with a plurality (two in the present preferred embodiment) of fasteners 64. The motor fixing bracket 58 includes a through-hole 58*a*, and the output shaft 54*a* of the drive motor 54 has its tip portion exposed from the through-hole 58*a*. The output shaft 54*a* is rotatable with respect to the motor fixing bracket 58 via a bearing 66.

Figure 6:
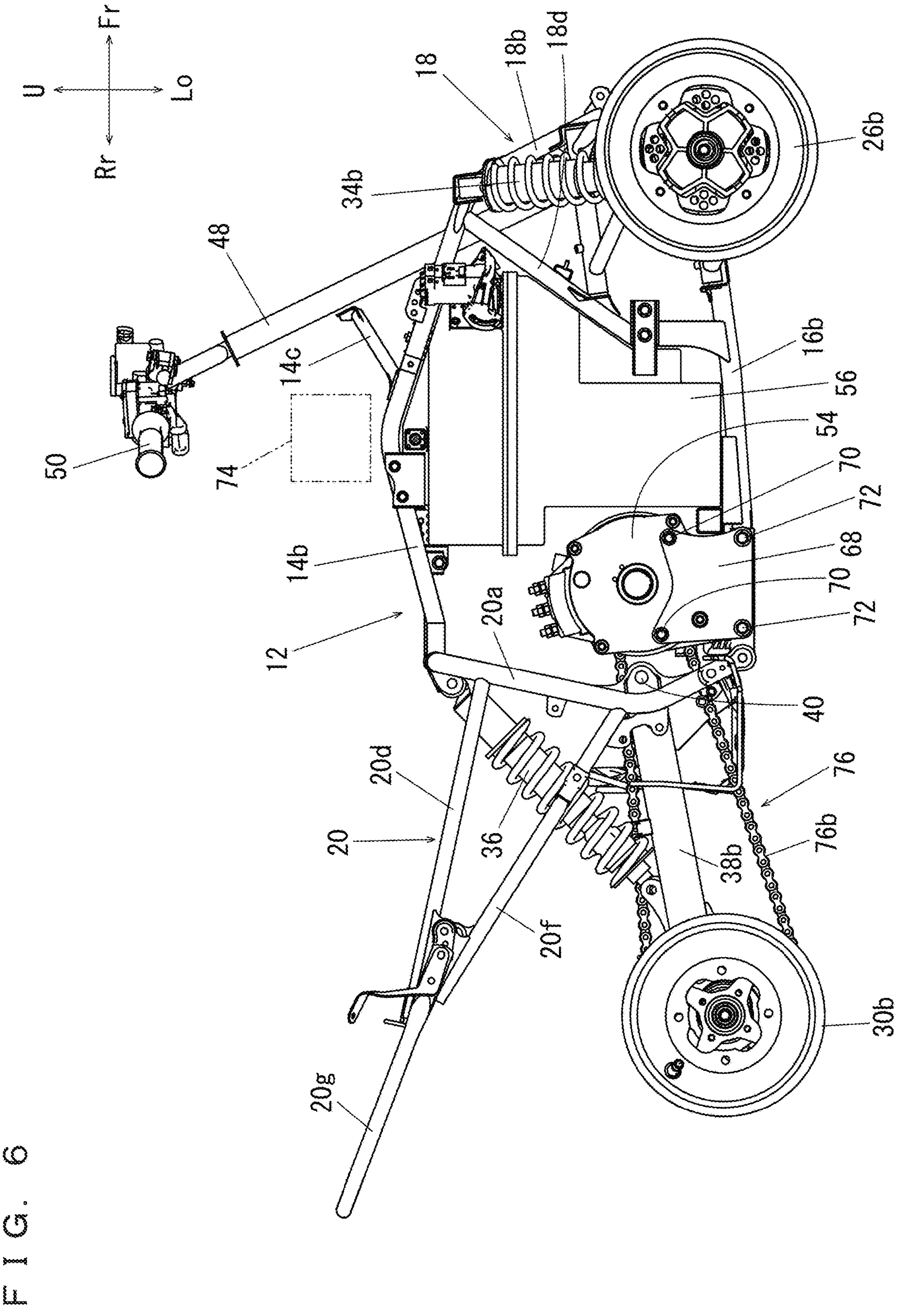
FIG. 6 is a side view which shows the vehicle in FIG. 3 viewed from the right.

Referring to FIG. 6, a motor fixing bracket 68 is attached to a non-output-side end portion (right end portion in the present preferred embodiment), where the output shaft 54*a* is not provided, of the drive motor 54, with a plurality (two in the present preferred embodiment) of fasteners 70. The motor fixing bracket 68 is attached to the lower frame 16*b* with a plurality (two in the present preferred embodiment) of fasteners 72.

As described, the drive motor 54 is fixed to the pair of lower frames 16*a*, 16*b* and supported on its both sides by the motor fixing brackets 58, 68.

Figure 5:
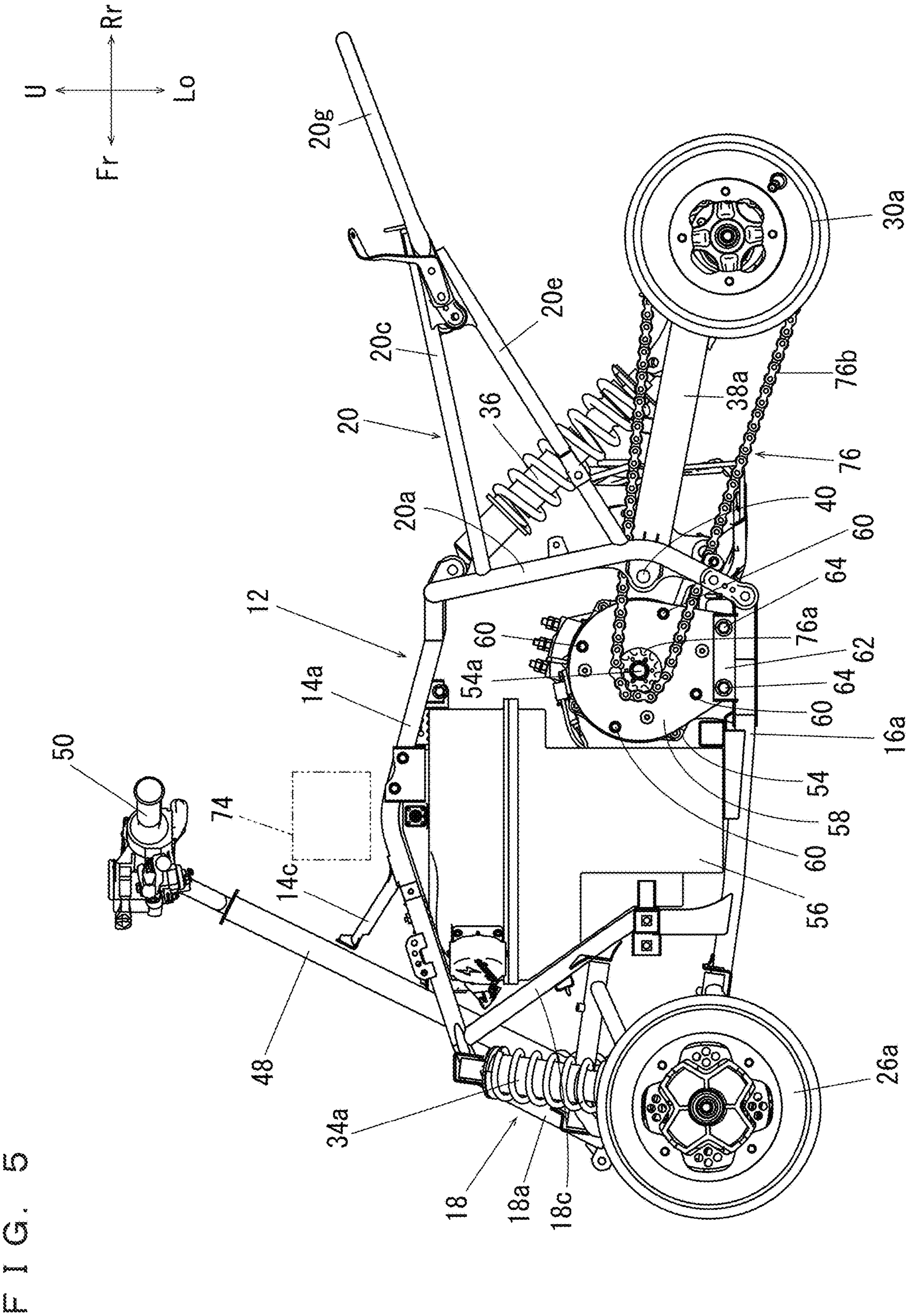
FIG. 5 is a side view which shows the vehicle in FIG. 3 viewed from the left.
Figure 9:
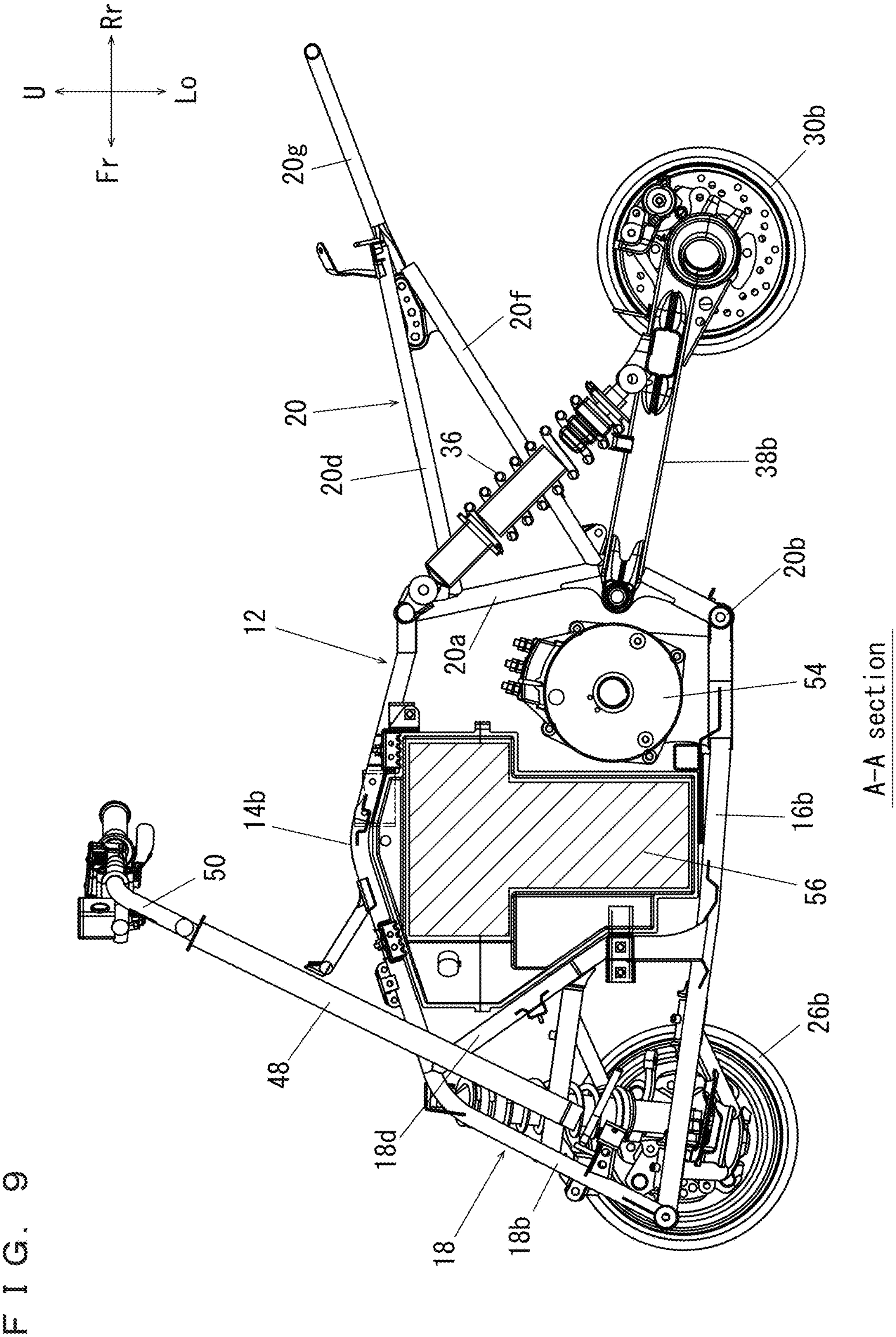
FIG. 9 is an illustrative sectional view taken along line A-A in FIG. 7.

Referring to FIG. 5, FIG. 6 and FIG. 9, in a side view, the drive motor 54 and the battery 56 are located in a region which is surrounded by the upper frames 14*a*, 14*b*, the lower frames 16*a*, 16*b*, the pair of second frames 18*c*, 18*d* of the front frame 18, and the third frame 20*a* of the rear frame 20. The open space defined by the upper frames 14*a*, 14*b*, the lower frames 16*a*, 16*b*, the front frame 18, and the rear frame 20 has a shape and a size for each of the drive motor 54 and the battery 56 to be installed therein from a side. In the present preferred embodiment, the drive motor 54 and the battery 56 are located inside the region which is surrounded by the upper frames 14*a*, 14*b*, the lower frames 16*a*, 16*b*, the second frames 18*c*, 18*d* of the front frame 18, and the third frame 20*a* of the rear frame 20, and do not overlap these frames in a side view. In a side view, the drive motor 54 and the battery 56 do not protrude downward from the pair of lower frames 16*a*, 16*b*.

Figure 7:
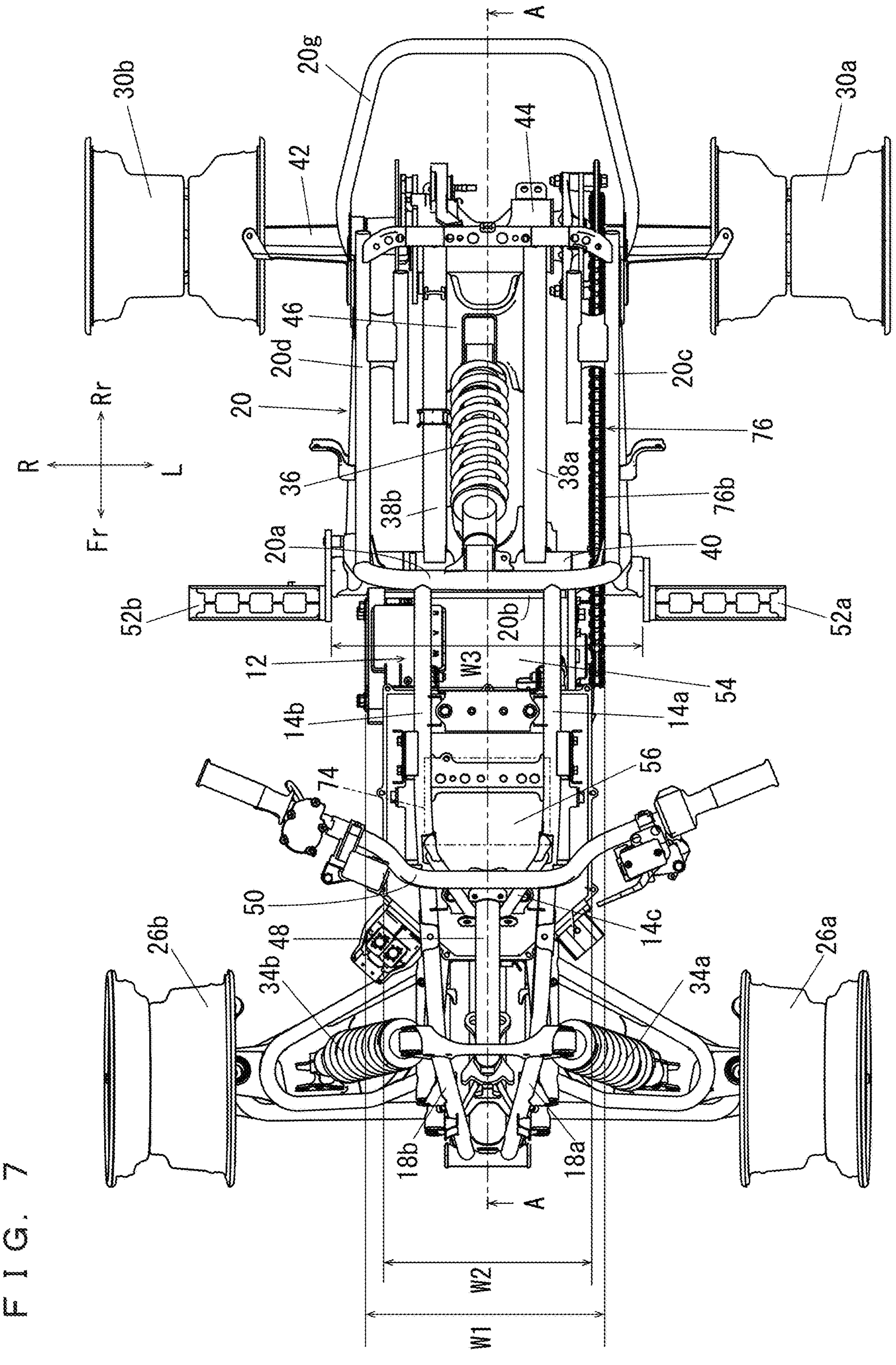
FIG. 7 is a plan view which shows the vehicle in FIG. 3.
Figure 8:
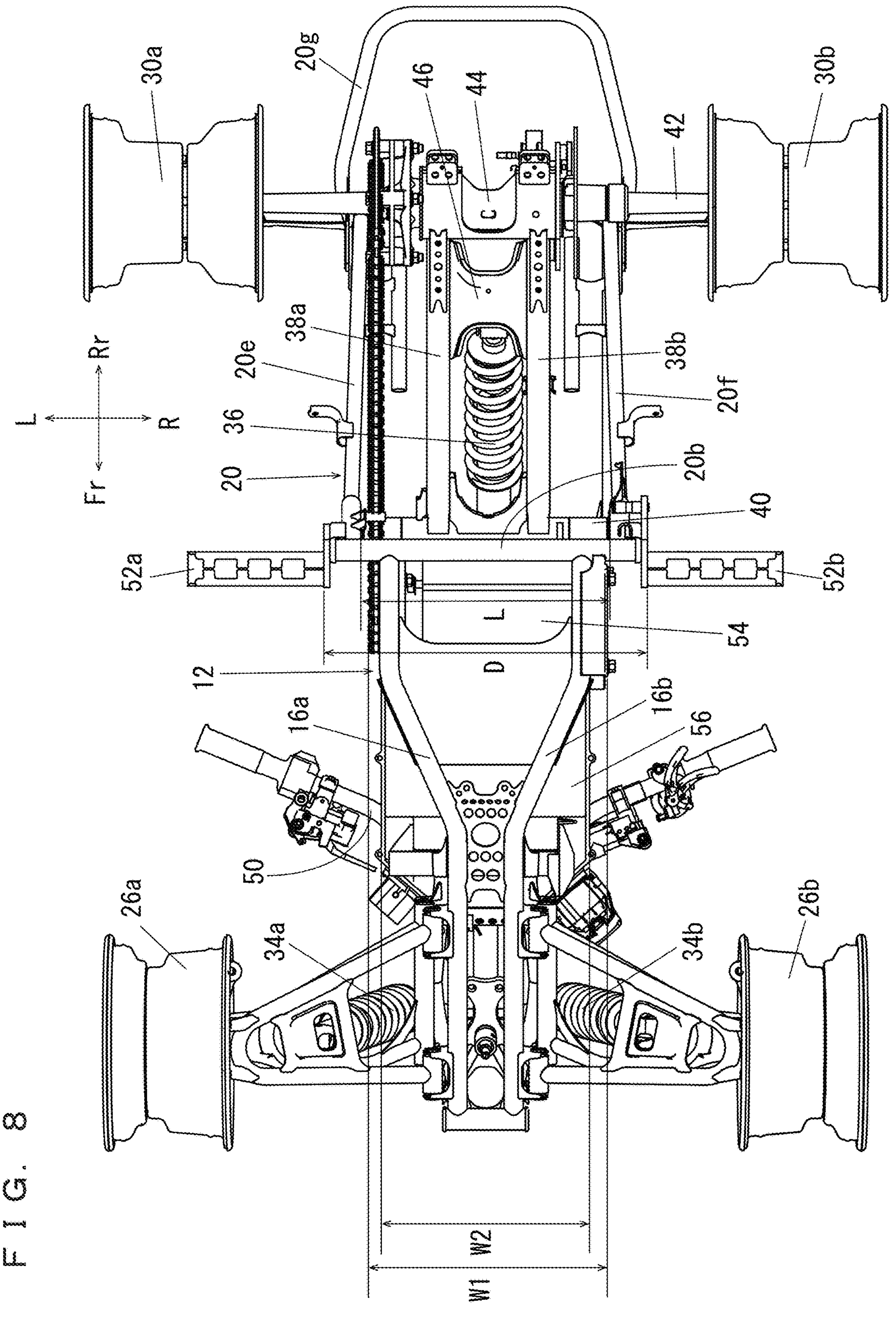
FIG. 8 is a bottom view which shows the vehicle in FIG. 3.

Referring to FIG. 7 and FIG. 8, the battery 56 is provided at a center location in the vehicle's width direction. The battery 56 overlaps the pair of lower frames 16*a*, 16*b* in a plan view. Referring further to FIG. 10, the drive motor 54 is slightly offset with respect to the vehicle's center (offset rightward in the present preferred embodiment) in the width direction. The drive motor 54 and the battery 56 have their respective widthwise lengths W1, W2 shorter than a widthwise dimension W3 of the rear frame 20 in a plan view. The drive motor 54 and the battery 56 are farther inward (inboard) in the vehicle width direction than the rear frame 20, and farther inward (inboard) in the vehicle width direction than the third frame 20*a*. The arrangement makes it easy for the driver of the vehicle to hold the vehicle body between his/her knees. In a plan view, the drive motor 54 and the battery 56 have their respective widthwise lengths W1, W2 shorter than an end-to-end length L of the pivot shaft 40. In a plan view, the drive motor 54 and the battery 56 have their respective widthwise lengths W1, W2 shorter than a distance D between the steps 52*a*, 52*b*. In this arrangement, when the driver puts his/her feet onto the steps 52*a*, 52*b*, the drive motor 54 and the battery 56 do not interfere with the driver, thus making it possible to enjoy a comfortable ride.

Referring to FIG. 5 through FIG. 7, a motor control unit (MCU) 74 is provided above the battery 56 in order to control the drive motor 54. The motor control unit 74 is supported by the pair of upper frames 14*a*, 14*b* via an unillustrated bracket.

The drive motor 54 and the pair of rear wheels 24*a*, 24*b* are connected with each other via an endless power transmission member 76. Power from the output shaft 54*a* is transmitted to the pair of rear wheels 24*a*, 24*b* via the power transmission member 76 to drive the pair of rear wheels 24*a*, 24*b*. The power transmission member 76 includes a sprocket 76*a* attached to the output shaft 54*a*, a sprocket (not illustrated) attached to the axle 42, and a chain 76*b* connecting the sprocket 76*a* and the axle-side sprocket with each other. Therefore, the power from the output shaft 54*a* is transmitted through the sprocket 76*a*, the chain 76*b*, and the axle-side sprocket, to the axle 42, and then to the pair of rear wheels 24*a*, 24*b*. The power transmission member 76, which includes the sprocket 76*a*, the chain 76*b* and the axle-side sprocket, is located farther inward in the vehicle width direction than the rear frame 20, and farther inward in the vehicle width direction than the third frame 20*a*. In order to cover the sprocket 76*a* of the power transmission member 76 and a portion of the chain 76*b*, a power transmission member cover 78 is attached to the motor fixing bracket 58 (see FIG. 1). The power transmission member cover 78 is attached to the motor fixing bracket 58 with a plurality (three in the present preferred embodiment) of fasteners 80.

Referring to FIG. 1 and FIG. 2, the straddled seat 82 and an exterior portion 84 are mounted to the body frame 12.

The straddled seat 82 is at a position higher than the drive motor 54, and is supported by the pair of fourth frames 20*c*, 20*d* of the rear frame 20.

The exterior portion 84 includes a top cover 84*a* located forward of the straddled seat 82, a front fender 84*b* located forward of the top cover 84*a*, and a rear fender 84*c* located behind the top cover 84*a* to surround the straddled seat 82. The top cover 84*a* includes a console box 84*d* attached thereto. The console box 84*d* is above the battery 56.

According to the vehicle 10 as described, the drive motor 54 and the pair of rear wheels 24*a*, 24*b* are connected with each other via the endless power transmission member 76, and the drive motor 54 is located farther forward than the swing arms 38*a*, 38*b*. Therefore, in a configuration utilizing the endless power transmission member 76, the layout of the drive motor 54 is not limited by the swing arms 38*a*, 38*b*, i.e., it is possible to increase the freedom in the layout of the drive motor 54. Also, the layout of the sprocket 76*a* is easy, thus making it easy to secure a chain line.

The power transmission member 76 is provided farther inward in the vehicle width direction than the rear frame 20. Therefore, it is possible to make effective use of a space which is outboard of the rear frame 20.

The widthwise length W1 of the drive motor 54 is shorter than the end-to-end length L of the pivot shaft 40. Therefore, it is possible to reduce the dimension of the drive motor 54 in the widthwise direction of the vehicle, thus making it possible to utilize the space on the side of the drive motor 54 effectively.

It is possible to fix the drive motor 54 to the lower frame 16*a* easily via the motor fixing bracket 58.

By attaching the power transmission member cover 78 directly to the motor fixing bracket 58, it is possible to decrease the number of parts.

Both sides of the drive motor 54 is fixed to the pair of lower frames 16*a*, 16*b*. This increases the mounting rigidity of the drive motor 54, thus making it possible to reduce wobble of the drive motor 54. Therefore, it becomes possible to further stabilize operation of the drive motor 54.

The drive motor 54 is located in a region surrounded by the upper frames 14*a*, 14*b*, the lower frames 16*a*, 16*b*, the front frame 18, and the rear frame 20 in a side view. Therefore, the drive motor 54 is attachable/detachable from a side of the vehicle, i.e., thus making assembly and maintenance operations easy.

In a side view, the drive motor 54 is forward of the rear frame 20. Therefore, it is now possible to locate heavy components at/around the vehicle's center of gravity, and concentrate the mass of the vehicle 10. Also, it is possible to improve the freedom of the size of the drive motor 54 without limitation posed by the swing arms 38*a*, 38*b*.

By offsetting the drive motor 54 with respect to the vehicle center, toward the opposite side from the sprocket 76*a* (rightward in the present preferred embodiment), it becomes possible to increase a layout space on the side of the sprocket 76*a* without increasing the width of the body frame 12.

Preferred embodiments of the present invention described above are suitably applied to an ATV.

It should be noted here that as will be described below, there may be a transmission provided between the drive motor and the power transmission member. In FIG. 12A through FIG. 14B, a drive motor and a transmission are shown schematically as white rectangles to help understanding of the these structures. Note, however, that the drive motor and the transmission are located in a region surrounded by upper frames, lower frames, a front frame, and a rear frame in a side view. Also, it is preferable that the battery is located at a vacant space within the region in the side view.

Figure 12B:
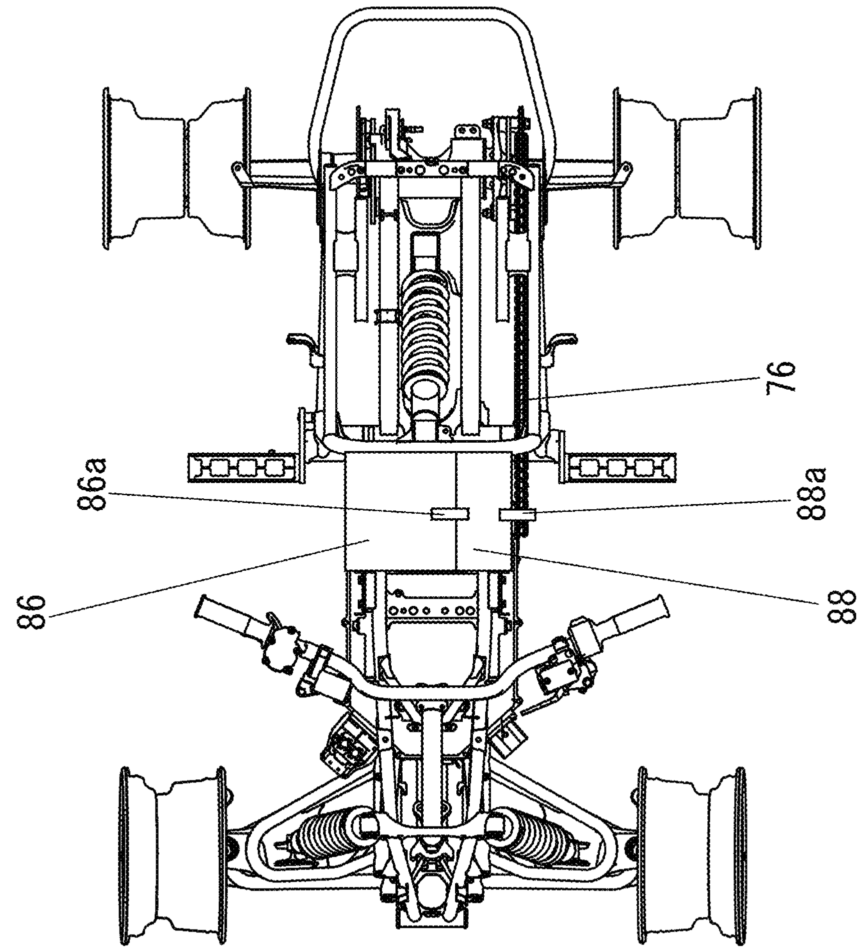
Figure 12A:
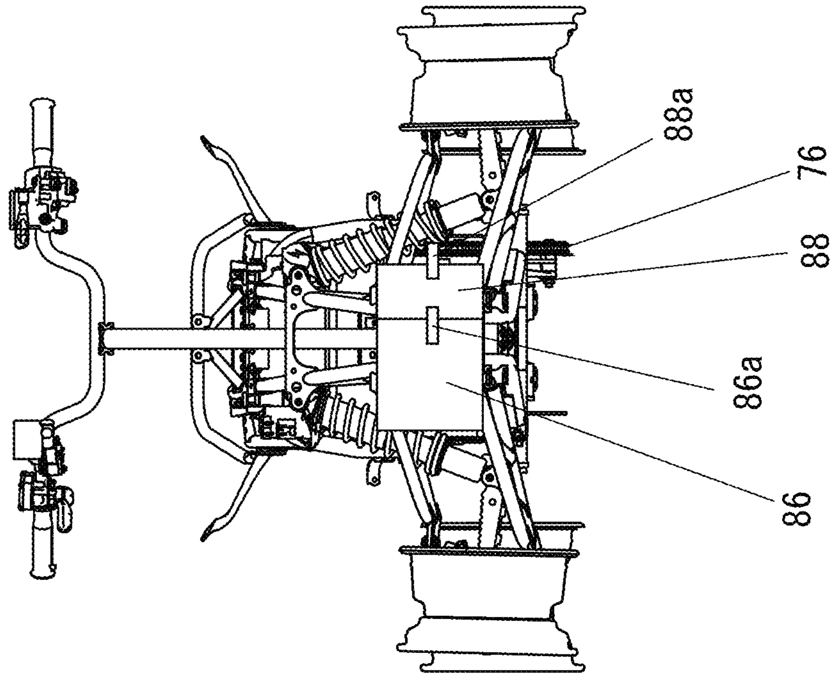

In a preferred embodiment shown in FIGS. 12A and 12B, a transmission 88 is provided between a drive motor 86 and the power transmission member 76 in order to change the speed of an output from the drive motor 86. The drive motor 86 is offset rightward with respect to the vehicle's center. The drive motor 86 includes an output shaft 86*a*, which is located leftward of the drive motor 86 and connected with the transmission 88. The transmission 88 is on a left side of the drive motor 86. The transmission 88 includes an output shaft 88*a*, with which the power transmission member 76 is connected.

According to the present preferred embodiment, it is possible to utilize the drive motor 86 highly efficiently, and improve electricity consumption and travel distance. Also, the output shaft 88*a* of the transmission 88 is able to simply be connected directly with the power transmission member 76. Therefore, the arrangement makes it possible to improve the freedom of layout of the drive motor 86. The same advantages are also provided in preferred embodiments shown in FIGS. 13A and 13B and FIGS. 14A and 14B.

Also, the arrangement allows the drive motor 86 and the transmission 88 to be more compact, and to improve the freedom of layout of the battery and so on. Further, the addition of the transmission 88 does not affect the size of the vehicle, i.e., it is possible to prevent an increase in the total length of the vehicle, and therefore possible to concentrate the mass of the vehicle.

Figure 13B:
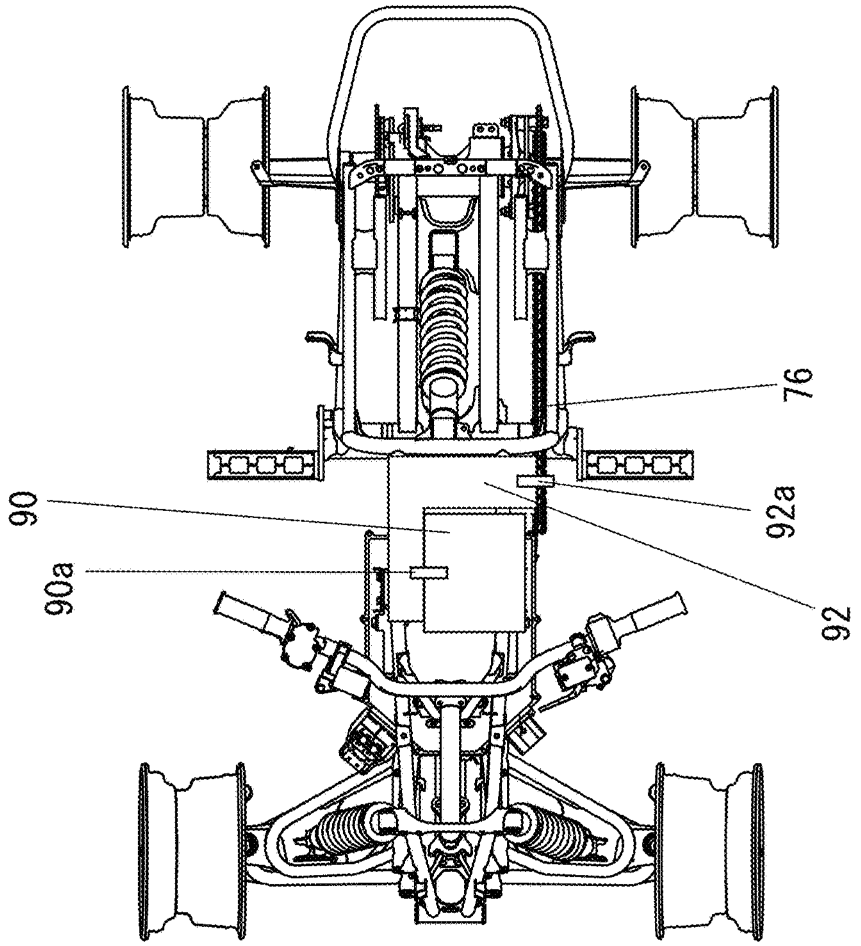
Figure 13A:
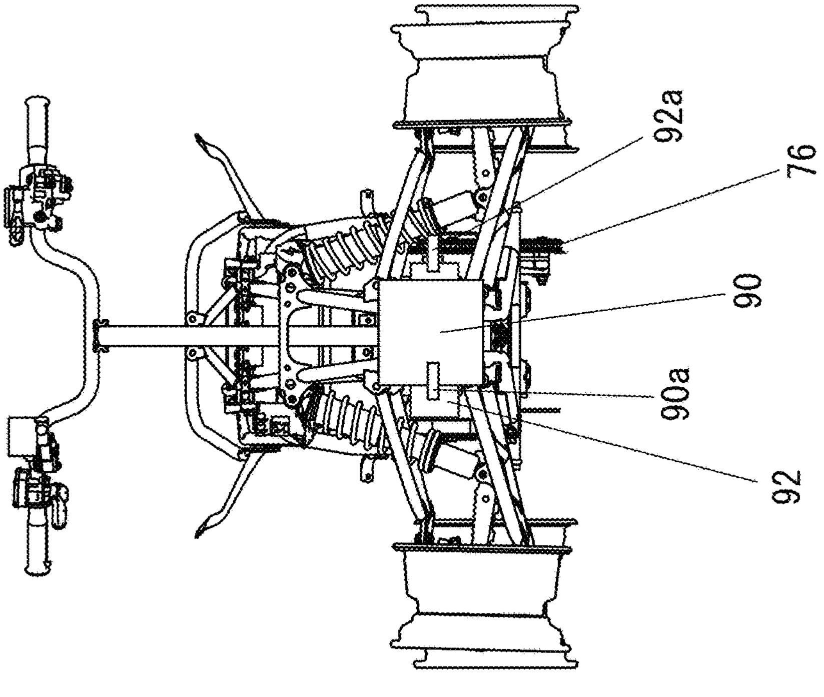

In a preferred embodiment shown in FIGS. 13A and 13B, a transmission 92 is provided between a drive motor 90 and the power transmission member 76 in order to change the speed of an output from the drive motor 90. The drive motor 90 is offset leftward with respect to the vehicle's center. The drive motor 90 includes an output shaft 90*a*, which is located rightward of the drive motor 90. The transmission 92 is positioned at a rightward-and-rearward location of the drive motor 90. The transmission 92 includes an output shaft 92*a* with which the power transmission member 76 is connected.

According to the present preferred embodiment, it is possible to improve the freedom of layout of the drive motor 90 with respect to the drive sprocket (the sprocket attached to the output shaft 92*a*) the location of which is limited. Also, it is possible to prevent an increase in the vehicle widthwise dimension. Further, it is possible to increase the freedom of the speed changing ratio.

Figure 14B:
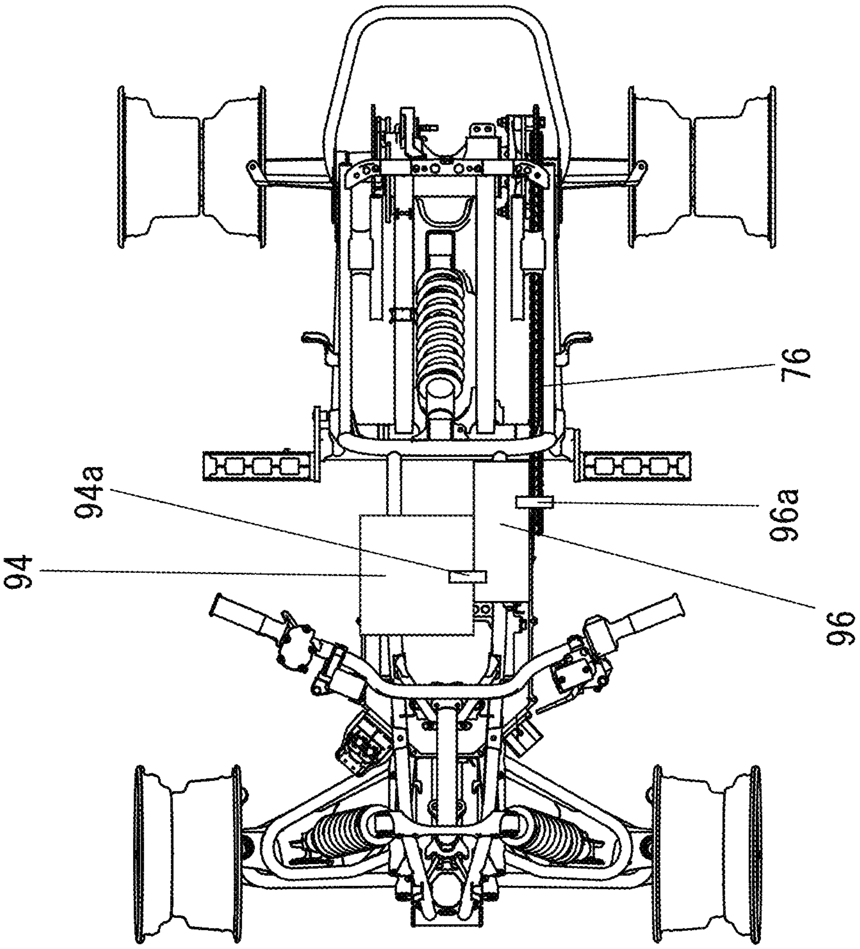
Figure 14A:
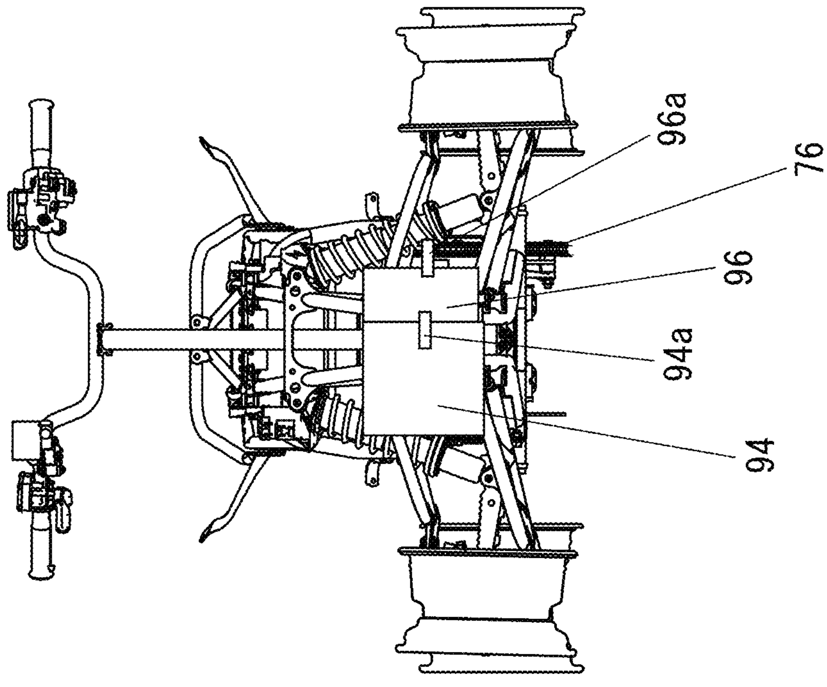

In a preferred embodiment shown in FIGS. 14A and 14B, a transmission 96 is provided between a drive motor 94 and the power transmission member 76 in order to change a speed of an output from the drive motor 94. The drive motor 94 is offset rightward with respect to the vehicle's center. The drive motor 94 includes an output shaft 94*a*, which is located leftward of the drive motor 94 and connected with the transmission 96. The transmission 96 is positioned on a left side of but slightly rearward than the drive motor 94. The transmission 96 includes an output shaft 96*a* with which the power transmission member 76 is connected.

According to the present preferred embodiment, it is possible to improve the freedom of layout of the drive motor 94 with respect to the drive sprocket (the sprocket attached to the output shaft 96*a*) the location of which is limited. Also, it is possible to keep the vehicle widthwise dimension compact. Further, it is possible to increase the freedom of the speed changing ratio.

In preferred embodiments described above, description was made for a case where the vehicle 10 includes a plurality of swing arms 38*a*, 38*b*. However, the present invention is not limited to this. The present invention is applicable to a vehicle which includes at least one swing arm.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:

a pair of upper frames spaced apart in a left-right direction of the vehicle;

a pair of lower frames spaced apart in the left-right direction;

a front frame connecting front portions of the pair of upper frames with the pair of lower frames;

a rear frame connecting rear portions of the pair of upper frames with rear portions of the pair of lower frames;

a pair of rear wheels;

a drive motor to drive the pair of rear wheels and including an output shaft;

a battery to supply electric power to the drive motor;

an endless power transmission to connect the drive motor with the pair of rear wheels;

a pivot shaft attached to the rear frame and extending in a widthwise direction of the vehicle;

a swing arm supported pivotably by the pivot shaft and supporting the pair of rear wheels;

a first motor fixing bracket between an output side of the drive motor and the lower frame to fix the drive motor to the lower frame, the first motor fixing bracket attached to an end portion of the output side of the drive motor and including a through-hole; and a second motor fixing bracket attached to an end portion of a non-output side of the drive motor; wherein the drive motor is located farther forward than the swing arm;

the drive motor is fixed to the pair of lower frames and supported on both the output side and the non-output side of the drive motor by the first motor fixing bracket and the second motor fixing bracket; and the output shaft extends through the through-hole such that a tip portion of the output shaft is exposed from the through-hole, and the output shaft is supported by the first motor fixing bracket.

2. The vehicle according to claim 1, wherein the power transmission is located inward of the rear frame in the widthwise direction of the vehicle.

3. The vehicle according to claim 1, wherein the output shaft of the drive motor extends in the widthwise direction of the vehicle; and a widthwise length of the drive motor is shorter than an end-to-end length of the pivot shaft.

4. The vehicle according to claim 1, further comprising a power transmission cover attached to the first motor fixing bracket to cover the power transmission.

5. The vehicle according to claim 1, wherein both sides of the drive motor are fixed to the pair of lower frames.

6. The vehicle according to claim 1, wherein the drive motor is located in an open space surrounded by the pair of upper frames, the pair of lower frames, the front frame, and the rear frame in a side view of the vehicle; and the open space allows the drive motor to be attached/detached from a side of the vehicle.

7. The vehicle according to claim 1, wherein the drive motor is farther forward than the rear frame in a side view of the vehicle.

8. The vehicle according to claim 1, further comprising:

a straddled seat provided at a higher position than the drive motor; and a bar handle provided at a higher position than the straddled seat.

9. The vehicle according to claim 1, wherein the rear frame includes a generally U-shaped frame connecting the rear portions of the pair of upper frames with the rear portions of the pair of lower frames; and the pivot shaft is attached to the generally U-shaped frame.

10. The vehicle according to claim 1, wherein the drive motor is non-rotatably fixed to the pair of lower frames.

11. The vehicle according to claim 1, further comprising a bearing between the output shaft of the drive motor and the through-hole of the first motor fixing bracket.

* * * * *